US008796365B2

(12) United States Patent
Maletzko et al.

(10) Patent No.: US 8,796,365 B2
(45) Date of Patent: Aug. 5, 2014

(54) THERMOPLASTIC MOLDING MATERIALS COMPRISING ORGANIC BLACK PIGMENTS

(75) Inventors: Christian Maletzko, Altrip (DE); Rüdiger Bluhm, Limburgerhof (DE); Bernd Trotte, Hemsbach (DE); Gunter Scherer, Neustadt (DE); Arno Bohm, Mannheim (DE)

(73) Assignee: BASF SE, Ludwigshafen (DE)

( * ) Notice: Subject to any disclaimer, the term of this patent is extended or adjusted under 35 U.S.C. 154(b) by 233 days.

(21) Appl. No.: 12/666,937

(22) PCT Filed: Jun. 24, 2008

(86) PCT No.: PCT/EP2008/058008
§ 371 (c)(1),
(2), (4) Date: Dec. 28, 2009

(87) PCT Pub. No.: WO2009/000830
PCT Pub. Date: Dec. 31, 2008

(65) Prior Publication Data
US 2010/0190897 A1  Jul. 29, 2010

(30) Foreign Application Priority Data
Jun. 28, 2007 (EP) .................................... 07111307

(51) Int. Cl.
C08K 5/09 (2006.01)
C08K 5/20 (2006.01)
C08K 5/101 (2006.01)
C08K 5/3447 (2006.01)

(52) U.S. Cl.
USPC ............. 524/90; 524/230; 524/318; 524/322; 524/394; 524/398; 524/399; 524/400

(58) Field of Classification Search
USPC ............. 524/87, 300, 301, 315, 322, 90, 230, 524/318, 394, 398, 399, 400
See application file for complete search history.

(56) References Cited

U.S. PATENT DOCUMENTS

| | | | |
|---|---|---|---|
| 2,513,188 A | 6/1950 | Macullum | |
| 3,354,129 A | 11/1967 | Edmunds, Jr. et al. | |
| 3,699,087 A | 10/1972 | Wood et al. | |
| 4,408,000 A * | 10/1983 | Lee ................................ | 524/315 |
| 4,645,826 A | 2/1987 | Iizuka et al. | |
| 7,416,601 B2 * | 8/2008 | Erk et al. ....................... | 106/498 |
| 7,491,788 B1 * | 2/2009 | Leenders et al. ............... | 528/196 |
| 2010/0184898 A1 | 7/2010 | Weber et al. | |
| 2010/0197859 A1 | 8/2010 | Weber et al. | |
| 2010/0286303 A1 | 11/2010 | Weber et al. | |
| 2011/0009566 A1 | 1/2011 | Jain et al. | |
| 2011/0155309 A1 | 6/2011 | Steininger et al. | |
| 2011/0196098 A1 | 8/2011 | Mettlach et al. | |
| 2011/0201747 A1 | 8/2011 | Weber et al. | |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0251337 A1 | 10/2011 | Weber et al. | |
| 2011/0294912 A1 | 12/2011 | Weber et al. | |
| 2011/0319550 A1 | 12/2011 | Weber et al. | |
| 2012/0029106 A1 | 2/2012 | Weber et al. | |
| 2012/0059109 A1 | 3/2012 | Weber et al. | |

FOREIGN PATENT DOCUMENTS

| | | |
|---|---|---|
| CH | 363 151 A | 7/1962 |
| DE | 28 42 005 A1 | 4/1980 |
| DE | 33 34 782 A1 | 10/1984 |
| DE | 35 06 472 A1 | 8/1986 |
| DE | 102004057876 A1 | 6/2006 |
| EP | A-62282 | 3/1982 |
| EP | 113112 A1 | 7/1984 |
| EP | 135 130 A2 | 3/1985 |
| EP | 1 413 605 A1 | 4/2004 |
| EP | 1 413 606 A1 | 4/2004 |
| EP | 1518883 A2 | 3/2005 |
| EP | 1541636 A1 | 6/2005 |

(Continued)

OTHER PUBLICATIONS

J. P. Critchley et al., "Heat Resistant Polymers", pp. 151 to 160 (1983), Plenum Press, New York.

(Continued)

Primary Examiner — Kriellion Sanders
(74) Attorney, Agent, or Firm — Drinker Biddle & Reath LLP

(57) ABSTRACT

The invention relates to thermoplastic molding compositions comprising (A) from 34 to 99.99% by weight of at least one thermoplastic polymer selected from (i) polyarylene ethers, (ii) polyetherimides, (iii) polyarylene sulfides, and (iv) polycarbonates with glass transition temperature of at least 145° C., or else copolymers of the abovementioned polymers (i) to (iv), (B) from 0.01 to 10% by weight of at least one organic black pigment which is transparent in the range from 1000 nm to 1600 nm and which has thermal stability up to at least 300° C. to DIN EN 12877-1, (C) from 0 to 6% by weight of at least one mold-release agent selected from fatty acids, or from esters and amides, (D) from 0 to 50% by weight of one or more additives, where the total of the % by weight figures from (A), (B), (C) and (D) gives 100% by weight.

The invention further relates to a process for preparation of the thermoplastic molding compositions, and to the moldings obtainable therefrom. Finally, the invention relates to the use of the thermoplastic molding compositions for reducing heat accumulation in plastics components, moldings, foils, or membranes.

17 Claims, No Drawings

(56) References Cited

FOREIGN PATENT DOCUMENTS

| | | |
|---|---|---|
| EP | 1633802 A1 | 3/2006 |
| EP | 1660556 A1 | 5/2006 |
| EP | 1670850 A1 | 6/2006 |
| GB | 962 941 A | 7/1964 |
| JP | 2003049078 A | 2/2003 |
| WO | WO-87/00540 A1 | 1/1987 |
| WO | WO-2005/078023 A2 | 8/2005 |
| WO | WO 2009/003901 | 1/2009 |
| WO | WO 2009/034114 | 3/2009 |
| WO | WO 2010/089241 | 8/2010 |
| WO | PCT/EP2010/069644 | 12/2010 |
| WO | WO 2011/000816 | 1/2011 |
| WO | WO 2011/009798 | 1/2011 |
| WO | WO 2011/051273 | 5/2011 |
| WO | WO 2011/069892 | 6/2011 |
| WO | WO 2011/073196 | 6/2011 |
| WO | WO 2011/073197 | 6/2011 |
| WO | WO 2011/117344 | 9/2011 |

OTHER PUBLICATIONS

Ullmann's Encyclopedia of Industrial Chemistry, 4$^{th}$ Ed., vol. 13, pp. 595-634, Verlag Chemie GmbH, Weinheim 1977.
U.S. Appl. No. 61/316,848.
U.S. Appl. No. 13/267,628, filed Oct. 6, 2011, Scherzer et al.
U.S. Appl. No. 13/376,665, filed Dec. 7, 2011, Weber et al.
U.S. Appl. No. 13/376,901, filed Dec. 8, 2011, Gibon et al.
U.S. Appl. No. 13/377,979, filed Dec. 13, 2011, Khvorost et al.
U.S. Appl. No. 13/382,782, filed Jan. 6, 2012, Scherzer et al.
U.S. Appl. No. 13/391,082, filed Feb. 17, 2012, Shahim et al.
U.S. Appl. No. 13/378,980, filed Mar. 1, 2012, Schmidt et al.

\* cited by examiner

THERMOPLASTIC MOLDING MATERIALS COMPRISING ORGANIC BLACK PIGMENTS

CROSS REFERENCE TO RELATED APPLICATIONS

This application is a national phase of PCT/EP2008/058008, filed on Jun. 24, 2008 which claims priority to EP 07111307.0 filed Jun. 28, 2007, the entire contents of all are hereby incorporated by reference.

The invention relates to thermoplastic molding compositions comprising
(A) from 34 to 99.99% by weight of at least one thermoplastic polymer selected from (i) polyarylene ethers, (ii) polyetherimides, (iii) polyarylene sulfides, and (iv) polycarbonates with glass transition temperature of at least 145° C., or else copolymers of the abovementioned polymers (i) to (iv),
(B) from 0.01 to 10% by weight of at least one organic black pigment which is transparent in the range from 1000 nm to 1600 nm and which has thermal stability up to at least 300° C. to DIN EN 12877-1,
(C) from 0 to 6% by weight of at least one mold-release agent selected from fatty acids, or from esters and amides,
(D) from 0 to 50% by weight of one or more additives,
where the total of the % by weight figures from (A), (B), (C) and (D) gives 100% by weight.

The invention further relates to a process for preparation of the thermoplastic molding compositions, and to the moldings obtainable therefrom. Finally, the invention relates to the use of the thermoplastic molding compositions for reducing heat accumulation in plastics components, moldings, foils, or membranes.

Modern design on the one hand and a high level of functional integration on the other hand are particular factors leading to a constant increase in the exposure of components or entire modules to thermal load due to heat accumulation in the electrical, electronics, and automobile industry.

For this reason, the materials known as amorphous or semicrystalline high-temperature thermoplastics (hereinafter HT thermoplastics) are often used in regions with exposure to high temperatures. Widely known examples of amorphous or semicrystalline HT thermoplastics are polyarylene ethers, e.g. polyether sulfone PESU, polysulfone PSU, polyphenylene sulfone PPSU, and polyether ketone PEK, and also polyetherimide PEI, and polyphenylene sulfide PPS (all abbreviations to DIN EN ISO 1043-1:2001), and also the materials known as high-temperature polycarbonates, with glass transition temperatures of at least 145° C.

These HT thermoplastics and blends or copolymers of the abovementioned classes of polymer are known from the prior art.

Prolonged use of electronic or electrical modules, and also lamps, such as halogen lamps and xenon lamps in headlamps, can generate and dissipate large amounts of heat. The result of this, however, caused by heat accumulation, is often temperature peaks extending beyond the thermal stability of the material, and this can lead, for example, to deformation or to impairment of the optical quality of the component.

Even the abovementioned HT thermoplastics often fail to meet some of the requirements for thermal stability under these conditions. The abovementioned HT thermoplastics in particular fail if the temperature in the module cannot be lowered via active or passive cooling and design considerations demand opaque, in particular black, coloring of components, since heat dissipation via radiated heat (for example through walls of a housing) is then also suppressed. The carbon black usually used for coloring very substantially absorbs radiant heat and thus undesirably promotes heating.

Specialty polymers have been developed for these cases, examples being specific polyetherimides, copolyetherimides, polyimide sulfones, and polyether sulfones, a feature of these being that they have very high glass transition temperatures above 225° C. and therefore also have relatively high heat distortion temperatures. The specialty polymers listed in EP 1633802, EP 1660556, EP 1670850, and EP 1518883 may be mentioned here by way of example.

Although these products can resist high temperatures, i.e. the housing components or headlamp reflectors are not destroyed or deformed in use, high temperatures are still found in the components, and they are therefore exposed to severe thermal load, often resulting in reduced lifetime.

A further disadvantage of the specialty polymers mentioned is their high melt viscosity, which is disadvantageous during processing, in particular in the injection-molding process, the result being restrictions in processing in terms of wall thickness and flow path length for the component.

EP-A 1 541 636 discloses thermoplastic polymer compositions and moldings with low heat accumulation. The reduction in heat accumulation is achieved via an inorganic pigment with infrared-reflecting properties. The polymer compositions disclosed relate to thermoplastic, rubber-modified vinyl polymers and polyolefins. There is no disclosure of HT thermoplastics. The thermal stability of the polymer compositions disclosed is not sufficient for demanding applications. Furthermore, a pigment that reflects radiant heat is expected to be ineffective, or insufficiently effective, when the location of the heat source is within the relevant module.

DE-A 10 2004 057 876 discloses black perylene pigments and their use for the coloring of high-molecular-weight organic and inorganic materials, in particular of coatings, printing inks and other inks, toners, polymers, paints, and plastics items, and in other application sectors. The perylene pigments disclosed in the application absorb in the entire visible region of the spectrum and are intensely black, and are transparent in the NIR region. A heat generation test is based on the internal temperatures below coated metal sheets which are externally irradiated using a halogen lamp. Although, alongside a wide variety of applications, the possibility of coloring of high-molecular-weight synthetic organic materials is also mentioned, no specific constitutions of thermoplastic molding compositions based on HT thermoplastics, or applications in plastics components and modules with high levels of heat dissipation are disclosed. Reduced internal heat accumulation requires the presence of radiant-heat-reflecting layers or particles in coatings or laminates.

It was therefore an object of the present invention to provide thermoplastic molding compositions which have good processability, in particular good melt viscosity. At the same time, high black value should be retained even at the high processing temperatures for the HT thermoplastics. A further object consisted in provision of thermoplastic molding compositions which exhibit minimum heating in continuous use. It should thus become possible to lower the temperature reached in plastics components, in particular in comparison with known black-colored HT thermoplastics. The intention moreover was to achieve a low level of heating in prolonged use when the location of the component radiating the heat is in the interior of the module which comprises the thermoplastic molding composition.

At the same time, the intention was to achieve a black coloration with a high black value and to achieve high opacity, i.e. low transparency in the visible region, while at the same time the pigment concentration is low. Relatively high pigment concentrations can undesirably increase heat accumulation. Accordingly, the intention was to obtain high opacity with ideal pigment concentration. The thermoplastic molding compositions should moreover exhibit high stiffness and high mechanical strength, and also high continuous-service temperature, and moreover high resistance to hydrolysis. There should be no formation of deposits within the component in prolonged use or during frequent heating and cooling.

A further object consisted in providing a process for reducing heat accumulation in plastics components composed of HT thermoplastics. Finally, the intention was to find a process for preparation of the inventive thermoplastic molding compositions.

The object has been achieved via use of the inventive molding compositions. Preferred embodiments are found in the claims and in the description. Combinations of preferred embodiments are within the scope of this invention.

According to the invention, the thermoplastic molding compositions comprise from 34 to 99.99% by weight of component (A), from 0.01 to 10% by weight of component (B), from 0 to 6% by weight of component (C), and from 0 to 50% by weight of component (D), where the total of the % by weight figures derived from (A), (B), (C), and (D) gives 100% by weight. Components (A) to (D) that can be used are explained below.

The thermoplastic molding compositions preferably comprise from 50 to 99.97% by weight of component (A), from 0.02 to 6% by weight of component (B), from 0.01 to 6% by weight of component (C), and from 0 to 38% by weight of component (D).

In particular, the thermoplastic molding compositions comprise from 65 to 99.97% by weight of component (A), from 0.02 to 2% by weight of component (B), from 0.01 to 2% by weight of component (C), and from 0 to 31% by weight of component (D).

The thermoplastic molding compositions particularly preferably comprise from 70 to 98.96% by weight of component (A), from 0.02 to 2% by weight of component (B), from 0.02 to 1% by weight of component (C), and from 1 to 27% by weight of component (D).

Thermoplastic Polymers (A)

According to the invention, the thermoplastic molding compositions comprise, as component (A), from 34 to 99.99% by weight of at least one thermoplastic polymer selected from the group consisting of (i) polyarylene ethers, (ii) polyetherimides, (iii) polyarylene sulfides, and (iv) polycarbonates with glass transition temperature of at least 145° C., or else copolymers of the abovementioned polymers (i) to (iv).

Copolymers of (i) polyarylene ethers, (ii) polyetherimides, (iii) polyarylene sulfides, and (iv) polycarbonates here are (i) copolyarylene ethers, (ii) copolyetherimides, (iii) copolyarylene sulfides, and (iv) copolycarbonates, which in each case comprise at least 30% by weight of the monomer units of the corresponding polymers (i) to (iv), where the balance of units making up 100% by weight has been selected from monomer units of the respective other polymers (i) to (iv), and monomer units of polyamides. The term copolymer includes block copolymers.

The corresponding copolymers preferably comprise from 40 to 100% by weight, preferably from 60 to 100% by weight, in particular from 80 to 100% by weight, of the monomer units of the polymers (i) to (iv), where the balance of units making up 100% by weight has been selected from units of the polymers (i) to (iv). Very particular preference is given to the polymers (i) to (iv) which comprise 100% by weight of monomer units of the respective polymers (i) to (iv) and are not copolymers.

Polyarylene Ethers

In one first preferred embodiment, the inventive thermoplastic molding compositions comprise, as component (A), from 34 to 99.99% by weight of at least one thermoplastic polymer selected from polyarylene ethers and copolyarylene ethers.

The terms polysulfones, polyether sulfones, polyarylene ethers, and polyarylene ether sulfones are not always used uniformly in the literature. The term polysulfone generally means a polymer whose repeat unit has linkage via sulfone groups —$SO_2$—. The term polyarylene ethers combines, for the purposes of the present invention, polyarylene ethers in the relatively narrow sense and polyarylene ether sulfides, polyarylene ether sulfones, and polyarylene ether ketones.

The arylene groups of these can be identical or different and, independently of one another, are an aromatic radical having from 6 to 18 carbon atoms, and preferably have exclusively para-linkage. Examples of suitable arylene radicals are phenylene, biphenylene, terphenylene, 1,5-naphthylene, 1,6-naphthylene, 1,5-anthrylene, 9,10-anthrylene and 2,6-anthrylene. Among these, 1,4-phenylene and 4,4'-biphenylene are preferred. These aromatic radicals are preferably unsubstituted, but they may carry one or more substituents. Examples of suitable substituents are alkyl, arylalkyl, aryl, nitro, cyano and alkoxy, and also heteroaromatics, such as pyridine, and halogens. Preferred substituents include alkyl having up to 10 carbon atoms, e.g. methyl, ethyl, isopropyl, n-hexyl, isohexyl, $C_1$-$C_{10}$-alkoxy, such as methoxy, ethoxy, n-propoxy, n-butoxy, aryl having up to 20 carbon atoms, e.g. phenyl and naphthyl, and also fluorine and chlorine. These can have linkage not only by way of —O— but also, for example, by way of —S—, —SO—, —$SO_2$—, —CO—, —N=N—, —COO—, alkylene or a chemical bond. The arylene groups in the polyarylene ethers can also have linkage to one another by way of different groups.

Preferred polyarylene ethers include those with repeat units of the general formula I

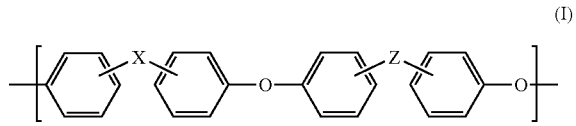

It is also possible to use ring-substituted derivatives of these. Preferred substituents that can be used are $C_1$-$C_6$-alkyl, such as methyl, ethyl, or tert-butyl, $C_1$-$C_6$-alkoxy, such as methoxy or ethoxy, aryl, in particular phenyl, or chlorine or fluorine. The variable X can be —$SO_2$—, —SO—, —S—, —O—, CO, —N=N—, —RC=$CR^a$—, —$CR^bR^c$— or a chemical bond. The variable Z can be —$SO_2$—, —SO—, —CO—, —O—, —N=N—, or —RC=$CR^a$. Each of R and $R^a$ here is hydrogen, $C_1$-$C_6$-alkyl, such as methyl, n-propyl, or n-hexyl, $C_1$-$C_6$-alkoxy, among which is methoxy, ethoxy, or butoxy, or aryl, in particular phenyl. Each of the radicals $R^b$ and $R^c$ can be hydrogen or a $C_1$-$C_6$-alkyl group, in particular methyl. However, they can also have linkage to one another to give a $C_4$-$C_{10}$-cycloalkyl ring, preferably cyclopentyl ring or cyclohexyl ring, which in its turn can have substitution by one or more alkyl groups, preferably methyl. $R^b$ and $R^c$ can also be a $C_1$-$C_6$-alkoxy group, such as methoxy or ethoxy, or an aryl group, particularly phenyl. Each of the abovementioned groups can in turn have substitution by chlorine or fluorine.

Some of the preferred repeat units I are listed below:
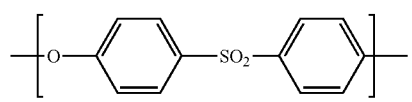
(I1)
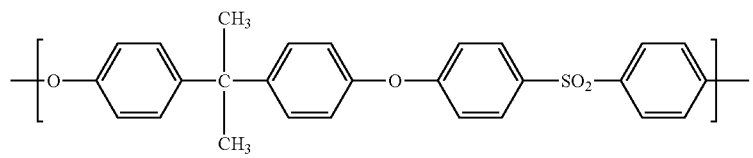
(I2)
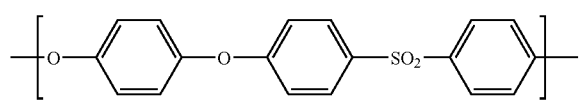
(I3)
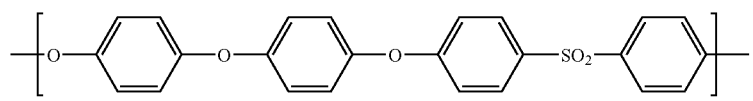
(I4)
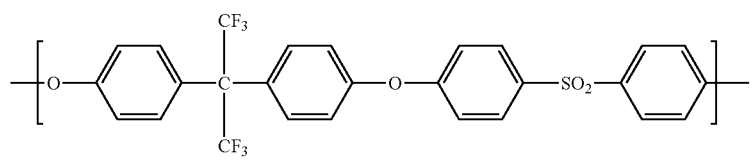
(I5)
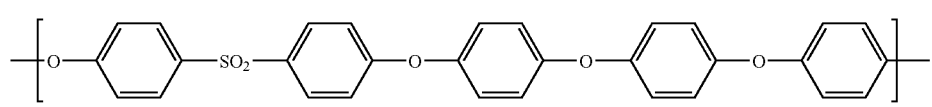
(I6)
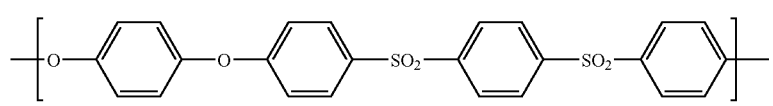
(I7)
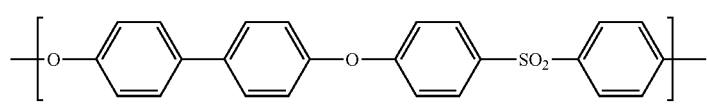
(I8)
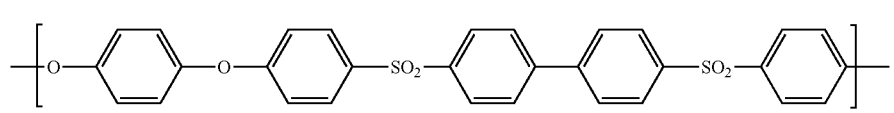
(I9)
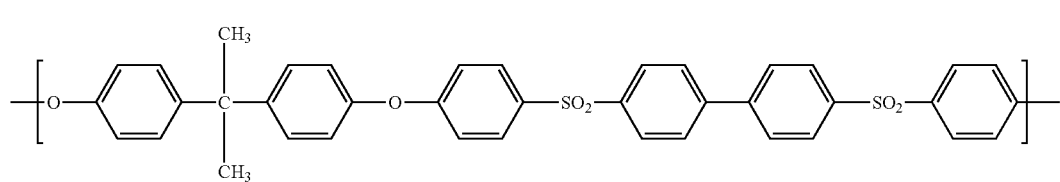
(I10)
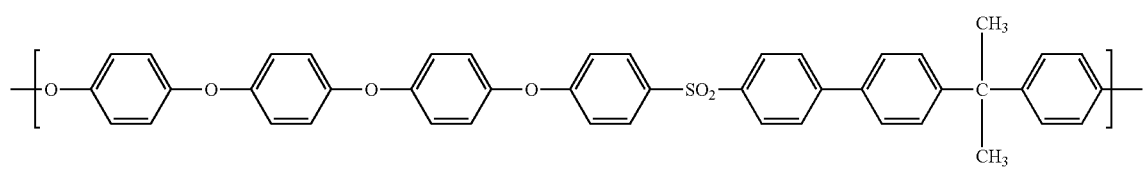
(I11)

-continued
(I12)
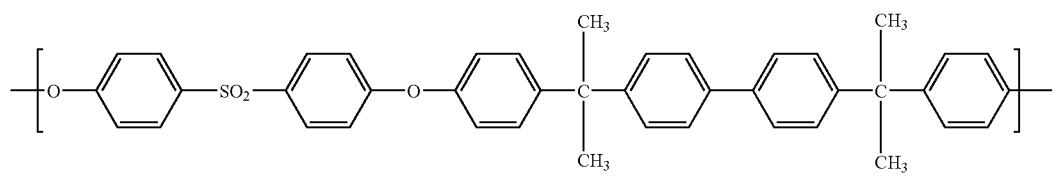
(I13)
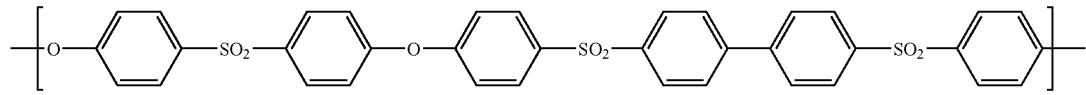
(I14)
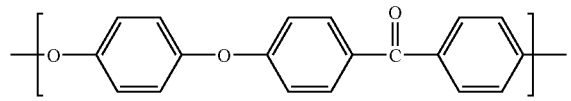
(I15)
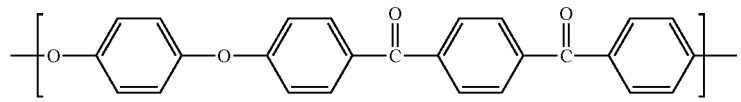
(I16)
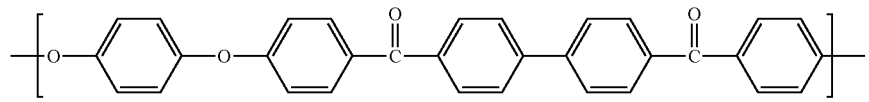
(I17)
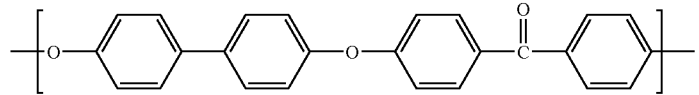
(I18)
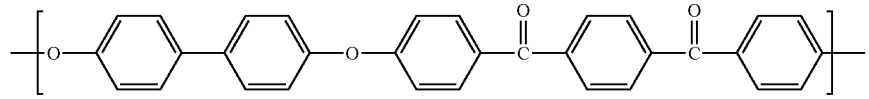
(I19)
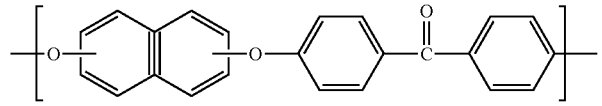
(I20)
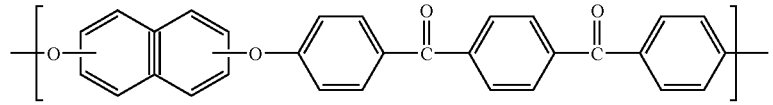
(I21)
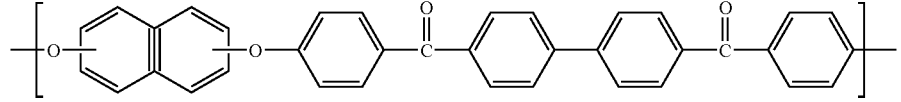
(I22)
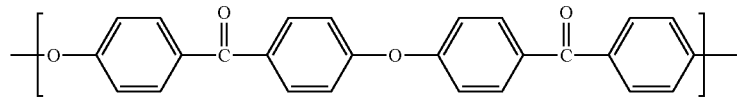
(I23)
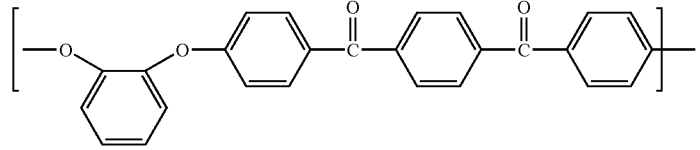
(I24)
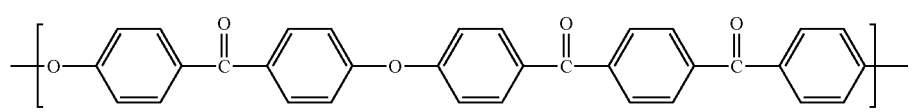

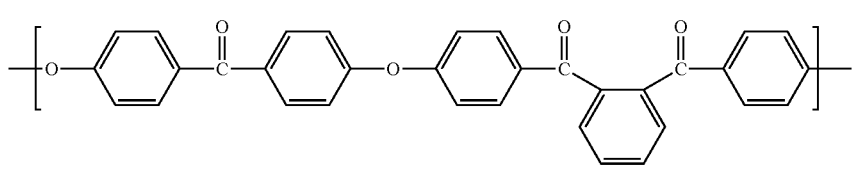
(I25)

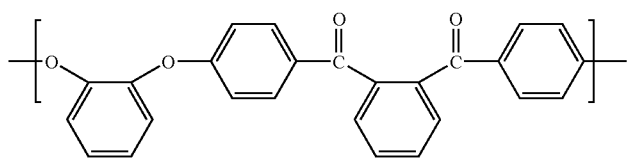
(I26)

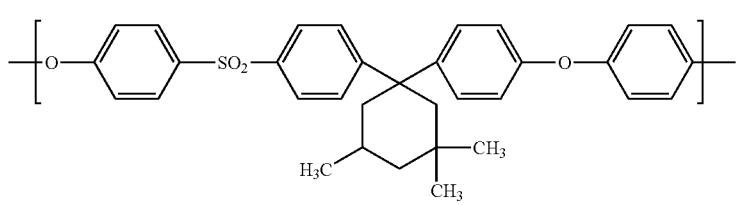
(I27)

Very particular preference is given to polyarylene ethers which comprise (I$_1$), (I$_2$), (I$_8$), (I$_{24}$), or (I$_{25}$) as repeat units. Examples among these are polyarylene ether sulfones which comprise from 0 to 100 mol %, preferably from 5 to 95 mol %, of structural units (I$_1$) and from 0 to 100 mol %, preferably from 5 to 95 mol %, of structural units (I$_2$).

The polyarylene ethers may also be copolymers or block copolymers, in which there are polyarylene ether segments and segments of other thermoplastic polymers, such as polyamides, polyesters, aromatic polycarbonates, polyestercarbonates, polysiloxanes, polyimides and polyetherimides. The molar mass of the blocks or of the graft branches in the copolymers is generally in the range from 1000 to 30 000 g/mol. The blocks of different structure may have alternating or random arrangement. The proportion by weight of the polyarylene ether segments in the copolymers or block copolymers is generally at least 3% by weight, preferably at least 10% by weight. The proportion by weight of the polyarylene ether sulfones or polyarylene ether ketones may be up to 97% by weight. Preference is given to copolymers or block copolymers whose proportion by weight of polyarylene ether segments is up to 90% by weight. Particular preference is given to copolymers or block copolymers with from 20 to 80% by weight of polyarylene ether segments.

The polyarylene ethers generally have average molar masses M$_n$ (number-average) in the range from 10 000 to 60 000 g/mol, and viscosity numbers from 30 to 150 ml/g. Depending on the solubility of the polyarylene ethers, the viscosity numbers are measured either in 1% strength by weight N-methylpyrrolidone solution, in mixtures of phenol and o-dichlorobenzene, or in 96% strength sulfuric acid, in each case at 20° C. or 25° C.

The polyarylene ethers are known per se or may be prepared by methods known per se.

Polyphenylene ethers may be prepared, for example, by oxidative coupling of phenols. Polyarylene ether sulfones or polyarylene ether ketones are prepared, for example, by condensing aromatic bishalogen compounds and the alkali metal double salts of aromatic bisphenols. They may also, for example, be prepared by autocondensation of alkali metal salts of aromatic halophenols in the presence of a catalyst.

The monomers are preferably reacted in the melt or in an inert high-boiling solvent. These include chlorobenzene, dichlorobenzene, xylene and trichlorobenzene, and also sulfones or sulfoxides, in particular dimethyl sulfone, diethyl sulfone, 1,1-dioxotetrahydrothiophene (sulfolane), or diphenyl sulfone, dimethyl sulfoxide, or diethyl sulfoxide, preferably dimethyl sulfoxide. Preferred solvents also include N-alkylpyrrolidones, in particular N-methylpyrrolidone. It is also possible to use N-substituted amides, such as N,N-dimethylformamide or N,N-dimethylacetamide. Mixtures of different solvents can also be used.

Preferred process conditions for synthesizing polyarylene ether sulfones or polyarylene ether ketones are described, for example, in EP-A-113 112 and 135 130.

The preferred polyarylene ethers generally have a melting point of at least 320° C. (polyarylene ether sulfones) or of at least 370° C. (polyarylene ether ketones).

Other compounds can that be used as component (A) are polyarylene ether sulfones or polyarylene ether ketones, where these are obtainable via reaction of a polyarylene ether sulfone or polyarylene ether ketone with a reactive compound. The reactive compounds comprise, alongside a carbon-carbon double or carbon-carbon triple bond, one or more carbonyl, carboxylic acid, carboxylate, anhydride, imide, carboxylic ester, amino, hydroxy, epoxy, oxazoline, urethane, urea, lactam, or halobenzyl group(s).

Examples of typical suitable compounds are maleic acid, methylmaleic acid, itaconic acid, tetrahydrophthalic acid, the associated anhydrides and imides, fumaric acid, the mono- and diesters of these acids, e.g. of C$_1$-C$_{18}$-alkanols, and the mono- or diamides of these acids, such as N-phenylmaleimide and maleic hydrazide.

Preference is given to the use of α,β-unsaturated dicarboxylic acids and/or anhydrides of these, and diesters and monoesters of the general structures II and III below.

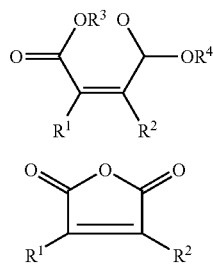

where R$^1$, R$^2$, R$^3$ and R$^4$, independently of one another, can be hydrogen or C$_1$-C$_{18}$-alkyl groups.

Particularly suitable compounds are maleic anhydride, fumaric acid and itaconic acid.

The polymers and the reactive compound may, for example, be reacted with one another in an aromatic solvent. Solvents which have proven particularly suitable are chlorobenzene, o-dichlorobenzene and N-methylpyrrolidone. A conventional free-radical initiator is generally used here. The reaction is generally carried through at from 75 to 150° C. The reaction product is obtained by precipitating with a conventional precipitating agent, such as low-molecular-weight alcohol and ketone, or by removing the solvent (e.g. in a vented extruder or thin-film evaporator).

However, the reactants may also, for example, be reacted at from 270 to 350° C. in the melt in a continuously operating or batch mixing system (e.g. a single- or twin-screw extruder or a kneader).

The reactive compound here is preferably metered in liquid form into the polymer melt, in particular within the kneading zone of a mixing system.

Component (A) is preferably a modified polyarylene ether sulfone or, respectively, ketone which has been obtained via reaction of from 80 to 99.9% by weight, in particular from 90 to 99% by weight, of the unmodified polyarylene ether sulfone or, respectively, ketone with from 0.1 to 20% by weight, in particular from 1 to 10% by weight, of the reactive compound.

Polyarylene ether sulfones grafted with from 0.1 to 1.5% by weight of maleic anhydride are particularly preferred as component (A). Preference is given here to polyarylene ether sulfones comprising from 5 to 95 mol % of units I$_1$ and from 5 to 95 mol % of units I$_2$.

Mention may be made here particularly of polyarylene ether sulfones having from 80 to 95 mol %, preferably from 85 to 95 mol %, of units of the formula I$_2$ and I$_1$ and correspondingly from 5 to 20 mol %, preferably from 5 to 15 mol %, of units of the formula I$_1$ and, respectively, I$_2$.

Free-radical initiators that can be used are generally the compounds described in the technical literature (e.g. J. K. Kochi, "Free Radicals", J. Wiley, New York, 1973).

The amounts usually used of the free-radical initiators are from about 0.01 to about 1% by weight, based on the polyarylene ether sulfones or, respectively, ketones used. It is, of course, also possible to use a mixture of different free-radical initiators.

Appropriately modified polyphenylene ethers are disclosed, inter alia, in WO 87/00540.

The proportion by weight of thermoplastic polymers (A) in the thermoplastic molding composition is generally in the range from 34 to 99.99% by weight, preferably from 50 to 99.97% by weight, in particular from 65 to 99.97% by weight, and particularly preferably from 70 to 98.96% by weight.

Polyarylene ethers are particularly preferred as thermoplastic polymer (A). Very particular preference is given to polyarylene ethers having sulfone groups (polyarylene ether sulfones).

Particularly preferred members of the polyarylene ether sulfones class are in particular bisphenol A polysulfone (CAS Registry Number® 25135-51-7), the ISO 1043 terminology for which is a polysulfone (PSU), poly(oxy-1,4-phenylenesulfonyl-1,4-phenylene) with CAS Registry Number® 25667-42-9, the ISO 1043 terminology for which is polyether sulfone (PESU), polyphenylene sulfone (PPSU) with poly(oxy-1,4-phenylenesulfonyl-1,4-phenyleneoxy-1,4-phenylene-1,4-phenylene) structure.

Polyetherimides

In another preferred embodiment, the inventive thermoplastic molding compositions comprise, as component (A), from 34 to 99.99% by weight of at least one thermoplastic polymer selected from polyetherimides and copolyetherimides.

Polyetherimides that can be used are in principle either aliphatic or aromatic polyetherimides. Other polyetherimides that can be used are those whose main chain comprises both aliphatic and aromatic groups. By way of example, it is possible to use polyetherimides which comprise repeat units of the general formula IV or of the formula IV$_a$

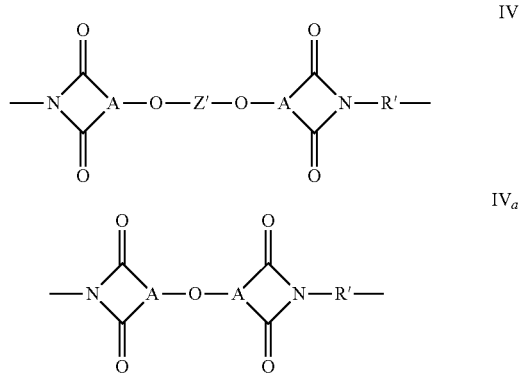

as component (A), where A has in particular been selected from

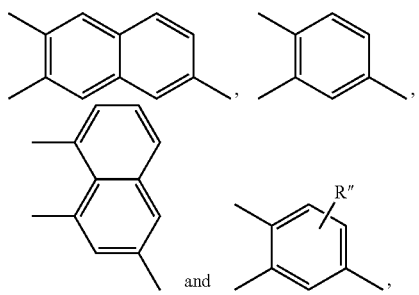

and where Z' and R' can be identical or independent of one another and different. Z' and R' can, for example, be a C$_1$-C$_{30}$-alkylene group. The alkylene group can be either linear or branched or else be a closed ring. Among these, mention may be made of methylene, ethylene, n-propylene, isopropylene, cyclohexylene, or n-decylene. Z' and R' can also, however, be a $C_7$-$C_{30}$-alkylarylene radical. Examples of these are diphenylenemethane, diphenyleneethane, or 2,2-diphenylenepropane. Z' and R' can moreover be a $C_6$-$C_{18}$-arylene radical, such as phenylene, diphenyl sulfone, or biphenylene. The abovementioned groups can in turn have one or more substituents, or have interruption by heteroatoms or by heteroatom groups. Particularly preferred substituents are halogen atoms, preferably chlorine or bromine, or $C_1$-$C_{10}$-alkyl radicals, in particular methyl or ethyl. Among the preferred heteroatoms or heteroatom groups are —$SO_2$—, —O—, or —S—. Some suitable radicals Z' and R' are listed below by way of example:

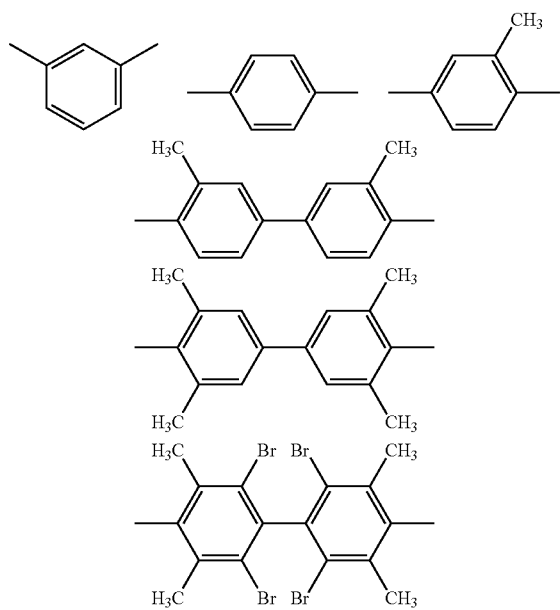

-continued

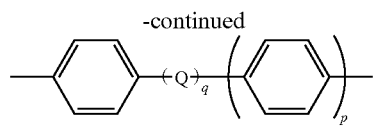

in which Q can in particular be —$C_yH_{2y}$—, —CO—, —$SO_2$—, —O—, or —S—. The variable q is 0 or 1, p is 0 or 1, and y is a whole number from 1 to 5.

R" can be $C_1$-$C_{10}$-alkyl or $C_1$-$C_{10}$-alkoxy. A preferred component (A) is provided by polyetherimides which comprise repeat units of the general formula V

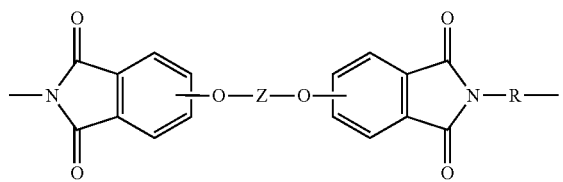

in which Z and R are defined as for Z' and R'.

Polyetherimides particularly preferred as component (A) comprise repeat units in which Z is

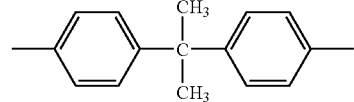

and R has been selected from

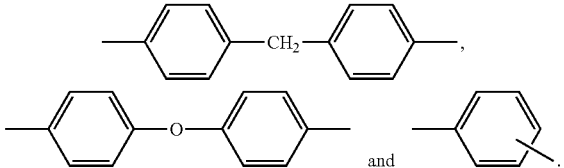

Very particularly preferred polyetherimides comprise repeat units of the formula $VI_1$:

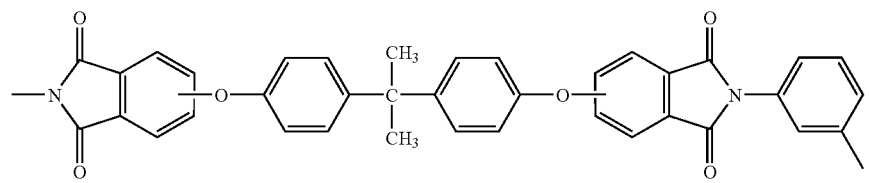

The average molar masses (number-average $M_n$) of the polyetherimides as component (A) are generally from 5000 to 50 000 g/mol, preferably from 8000 to 40 000 g/mol. These polyetherimides are known or obtainable by known methods.

Appropriate dianhydrides can therefore be reacted with appropriate diamines to give the polyetherimides. This reaction generally takes place in bulk or in an inert solvent at temperatures of from 100 to 250° C. Especially suitable solvents are o-dichlorobenzene or m-cresol. The polyetherimides can also be prepared in the melt at temperatures from 200 to 400° C., preferably from 230 to 300° C. The polyetherimides are generally prepared by reacting the dianhydrides with the diamines in an equimolar ratio. However, it is possible to use certain molar excesses, e.g. from 0.1 to 5 mol %, of dianhydride or diamine.

Polyarylene Sulfides

In another preferred embodiment, the inventive thermoplastic molding compositions comprise, as component (A), from 34 to 99.99% by weight of at least one thermoplastic polymer selected from polyarylene sulfides and copolyarylene sulfides.

In principle, any of the polyarylene sulfides can be used as component (A). Preference is given to polyarylene sulfides which comprise more than 30 mol %, in particular more than 70 mol %, of repeat units VII:

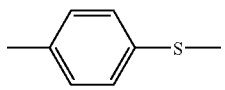

Examples of other repeat units that may be mentioned are

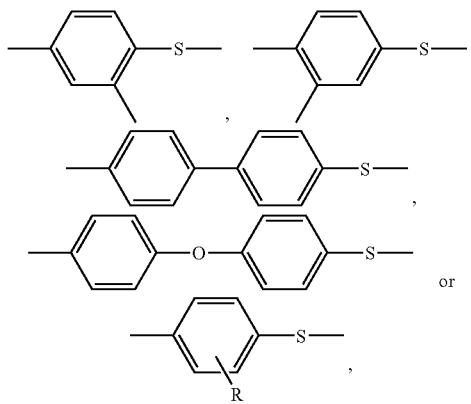

in which R is $C_{1-10}$-alkyl, preferably methyl, and n is either 1 or 2. The polyarylene ether sulfides can be random copolymers or else block copolymers. Very particularly preferred polyphenylene sulfides comprise 100 mol % of units of the general formula (VII).

Examples of end groups that can be used are halogen, thiol, or hydroxy, preferably halogen.

The polyarylene sulfides can be branched or unbranched. The molar masses of the preferred polyarylene sulfides are from 1000 to 1 000 000 g/mol.

Polyarylene sulfides are known per se or obtainable by known methods. By way of example, they can, as described in U.S. Pat. No. 2,513,188, be prepared via reaction of halogenated aromatics with sulfur or with metal sulfides. It is also possible to heat metal salts of halo-substituted thiophenols (see GB-B 962 941). Among the preferred syntheses of polyarylene sulfides is the reaction of alkali metal sulfides with halogenated aromatics is solution, as found, for example, in U.S. Pat. No. 3,354,129. Further processes are described in U.S. Pat. No. 3,699,087, U.S. Pat. No. 4,645,826, and J. P. Critchley et al., "Heat Resistant Polymers", pages 151 to 160 (1983), Plenum Press, New York.

Polycarbonates

In another preferred embodiment, the inventive thermoplastic molding compositions comprise, as component (A), from 34 to 99.99% by weight of at least one thermoplastic polymer selected from polycarbonates and copolycarbonates whose glass transition temperature is at least 145° C., preferably at least 160° C., in particular at least 180° C.

Examples of suitable polycarbonates are those based on diphenols of the general formula VIII

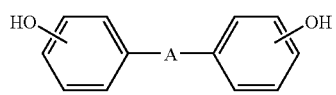

in which A is a single bond, a $C_1$-$C_3$-alkylene group, a $C_2$-$C_3$-alkylidene group, a $C_3$-$C_6$-cycloalkylidene group, or else —S— or —SO$_2$—.

Examples of preferred diphenols of the formula V are 4,4'-dihydroxybiphenyl, 2,2-bis(4-hydroxyphenyl)propane, 2,4-bis(4-hydroxyphenyl)-2-methylbutane, and 1,1-bis(4-hydroxyphenyl)cyclohexane. Particular preference is given to 2,2-bis(4-hydroxyphenyl)-propane (bisphenol A) and 1,1-bis(4-hydroxyphenyl)cyclohexane. However, among the preferred diphenols are also unsubstituted or substituted cyclohexylbisphenols. Among these, particular preference is given to trimethylcyclohexylbisphenol A of the formula (IX)

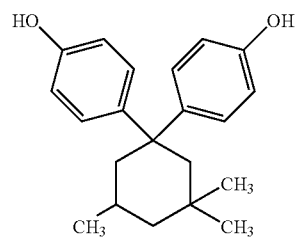

Homopolycarbonates and copolycarbonates are suitable as component A, and preference is given both to bisphenol A homopolymer and to the copolycarbonates of bisphenol A.

The suitable polycarbonates can have the known type of branching, and specifically preferably via introduction of from 0.05 to 2.0 mol %, based on the entirety of the diphenols used, of at least trifunctional compounds, such as those having three or more phenolic OH groups.

The polycarbonates suitable as component A can moreover have substitution at the aromatic units by from one to three halogen atoms, preferably chlorine and/or bromine. However, halogen-free compounds are particularly preferred.

It is particularly preferable to use polycarbonates whose relative viscosities $\eta_{rel}$ are from 1.10 to 1.50, in particular from 1.25 to 1.40 (measured in each case in 0.5% strength by weight solution in dichloromethane). This corresponds to average molecular weights $M_w$ (weight-average) of from 10 000 to 200 000, preferably from 20 000 to 80 000.

The diphenols of the general formula VIII and IX are known per se or can be prepared by known processes.

By way of example, the polycarbonates can be prepared via reaction of the diphenols with phosgene in the interfacial process or with phosgene in the homogeneous-phase process (known as the pyridine process), where the respective molecular weight to be established is achieved in a known manner via a corresponding amount of known chain terminators. (See, for example, DE-A 33 34 782 in relation to polydiorganosiloxane-comprising polycarbonates.)

Examples of suitable chain terminators are phenol, p-tert-butylphenol, or long-chain alkylphenols, such as 4-(1,3-tetramethylbutyl)phenol, according to DE-A 28 42 005, or monoalkylphenols or dialkylphenols having a total of from 8 to 20 carbon atoms in the alkyl substituents according to DE-A 35 06 472, examples being p-nonylphenyl, 3,5-di-tert-butylphenol, p-tert-octylphenol, p-dodecylphenol, 2-(3,5-dimethylheptyl)phenol, and 4-(3,5-dimethylheptyl)phenol.

Other suitable polycarbonates are those based on hydroquinone or resorcinol.

Organic Black Pigments (B)

According to the invention, the thermoplastic molding compositions comprise from 0.01 to 10% by weight of at least one organic black pigment which is transparent in the range from 1000 nm to 1600 nm and which has thermal stability up to at least 300° C. to DIN EN 12877-1.

For the purposes of the present invention, transparent in the wavelength range from 1000 to 1600 nm means that at a concentration of 0.0625% by weight of homogeneously incorporated organic black pigment (B) in a polyvinyl chloride film (PVC film) the reduction in transmittance in the wavelength range mentioned, in comparison with an otherwise identical PVC film of the same thickness but without black pigment (B)—hereinafter termed a standard—is at most 20%, preferably at most 15%, particularly preferably at most 10%, based on the transmittance of the standard. By way of example, if the transmittance of the standard at a certain wavelength in the wavelength range mentioned is 90%, the resultant transmittance in the otherwise identical PVC film comprising 0.0625% by weight of the black pigment (B) in this numerical example is at least 70%, preferably at least 75%, particularly preferably at least 80%.

Transparent in the wavelength range from 1000 to 1600 nm preferably means that the average transmittance, in the wavelength range mentioned, of a polymer film of thickness 1 mm, into which 0.05 g of the organic black pigment (B) has been homogeneously incorporated per 80 g of polyvinyl chloride, is at least 65%, with preference at least 70%, in particular at least 75%.

Transmittance is determined by using an NIR spectrometer with a large Ulbricht sphere for integrated recording of diffusely transmitted radiation, recording a transmittance spectrum within the entire wavelength range mentioned. The appropriate test methods, including the necessary calibration, are well known to the person skilled in the art.

In order to determine the average value, a transmittance value is determined at intervals of 2 nm throughout the wavelength range mentioned, and used to determine the number-average value.

The test specimen is preferably produced here via addition of 0.05 g of the black pigment (B) to 80 g of polyvinyl chloride and then homogenization in a Turbula mixer, and then roll-milling at 150° C. 4 milled sheets thus obtained are stacked one on top of the other and pressed to give a milled-sheet packet of thickness 1 mm between two metal plates preheated to 145° C.

It is preferable that the critical absorption value, i.e. the value at which transmittance in a test specimen thus produced of thickness 1 mm with 0.0625% by weight concentration of the black pigment (B) in the PVC film is 50% in the wavelength range from 700 to 950 nm, preferably from 750 to 900 nm, in particular from 760 nm to 850 nm.

In one preferred embodiment, the thermoplastic molding compositions comprise organic black pigments which comprise one of the isomers of the formula P-Ia or P-Ib, or a mixture of the two isomers:

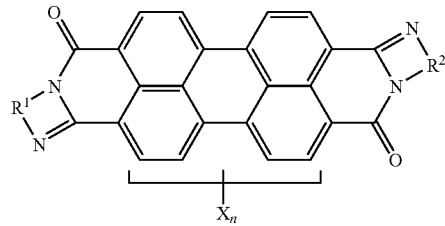

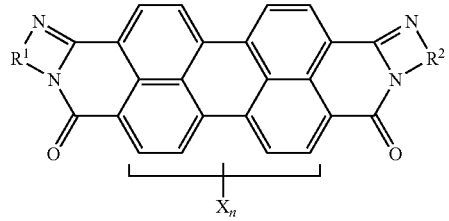

where the variables in P-Ia and P-Ib are defined as follows: $R^1$ and $R^2$ are, independently of one another, phenylene, naphthylene, or pyridylene, each of which can have one or more $C_1$-$C_{12}$alkyl, in particular $C_1$-$C_4$-alkyl, $C_1$-$C_6$-alkoxy, in particular $C_1$-$C_4$-alkoxy, hydroxy, nitro, and/or halogen, in particular chlorine or bromine, substituents. $R^1$ and $R^2$ are preferably, independently of one another, phenylene or naphthylene, each of which is preferably unsubstituted. X is halogen, in particular chlorine or bromine, and the number n is from 0 to 4.

In one particularly preferred embodiment, the inventive thermoplastic molding compositions comprise, as component (B), from 0.01 to 10% by weight of at least one of the isomers P-Ia' or P-Ib':

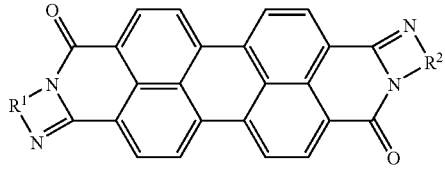

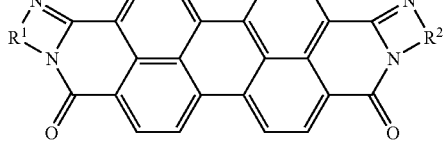

where the variables in P-Ia' and P-Ib' are defined as follows: $R^1$ and $R^2$ are, independently of one another, phenylene, naphthylene, or pyridylene, each of which can have one or more $C_1$-$C_{12}$-alkyl, in particular $C_1$-$C_4$-alkyl, $C_1$-$C_6$-alkoxy, in particular $C_1$-$C_4$-alkoxy, hydroxy, nitro, and/or halogen, in particular chlorine or bromine, substituents.

However, it is preferable that the phenylene, naphthylene, and pyridylene radicals in $R^1$ and $R^2$ according to P-Ia, P-Ib, P-Ia', and P-Ib' are unsubstituted, preference being given to the phenylene and naphthylene radicals and particular preference being given to the naphthylene radicals. It is very particularly preferable that $R^1$=$R^2$=phenylene, and $R^1$=$R^2$=naphthylene, the latter being very particularly preferred.

The term "mixture" here is intended to include physical mixtures and also preferably solid solutions (mixed crystals) of the compounds P-Ia and P-Ib and, respectively, P-Ia' and P-Ib'.

The organic black pigments (B) used absorb in the entire visible region of the spectrum and preferably feature intense blackness. The black value of the organic black pigment (B) is preferably at least 210 in an alkyd/melamine stoving lacquer, in particular at least 230. Accordingly, the organic black pigments (B) used preferably give deep-black, neutral full-shade colors. A white reduction gives neutral grays (e.g. perylene pigments P-Ia/P-Ib, where $R^1=R^2$=naphthylene) to colors having a slight to marked blue tinge (e.g. perylene pigments P-Ia/P-Ib, where $R^1=R^2$=phenylene).

To determine the black value, in each case a mixture of 1.0 g of the respective pigment and 9.0 g of an alkyd/melamine stoving lacquer (binder content 43% by weight, xylene-adjusted to 35% by weight) was shaken in a Skandex disperser for 60 min with 10 ml of glass beads (diameter 3 mm) in a 30 ml glass bottle. The resultant paste is then applied in the form of a layer of thickness 150 μm to a paperboard, air-dried, and stoved at 130° C. for 30 min. A spectrophotometer, preferably a Spectraflash SF 600 plus from Datacolor, is used to determine color coordinates, and then the black value is calculated from the following formula from the standard color coordinate Y: black value=100×log(100/Y).

The primary particle size of the organic black pigments (B) is generally ≤800 nm, preferably ≤500 nm, particularly preferably ≤200 nm, and they have low dispersion hardness, i.e. for example in plastics coloring their dispersion hardness DH is <5 to DIN 53775, sheet 7.

The preparation process for the black perylene pigments is known and is described by way of example in WO-2005/078023 on page 5, line 11 to page 14, line 31.

Mold-Release Agents (C)

There is only restricted possibility for use, in the inventive thermoplastic molding compositions, of the mold-release agents and/or lubricants usually used in thermoplastics and known to the person skilled in the art. Suitable mold-release agents (C) are those which have the required thermal stability and melt stability under the conditions of processing.

According to the invention, the thermoplastic molding compositions can comprise, as component (C), from 0 to 6% by weight of at least one mold-release agent selected from the group of the compounds consisting of fatty acids and metal salts, and esters and amides of fatty acids.

The inventive thermoplastic molding compositions preferably comprise, as component (C), from 0.01 to 6% by weight, in particular from 0.02 to 2% by weight, of at least one mold-release agent selected from the group of the compounds consisting of fatty acids and metal salts, and esters and amides of fatty acids.

It is particularly preferable that the at least one mold-release agent has been selected from the group of the compounds consisting of fatty acids and metal salts of fatty acids, and very particularly preferably selected from stearic acid and the metal salts of stearic acid.

If metal salts of fatty acids are used as mold-release agents (C), preference is then given to aluminum salts and zinc salts. The commercially available stearic acids, for example those traded as CAS No. 57-11-4, can comprise up to 35% of other fatty acids here.

If a polyarylene ether is used as component (A), stearic acid is then particularly preferred as mold-release agent (C).

Additives (D)

According to the invention, the thermoplastic molding compositions can comprise from 0 to 50% by weight, preferably from 0 to 38% by weight, particularly preferably from 0 to 31% by weight, in particular from 0 to 27% by weight, of one or more additives.

Particular additives (D) that can be used are antioxidants, UV stabilizers, heat stabilizers, flame retardants, flow improvers, dispersing agents, and reinforcing agents. These additives are known in principle to the person skilled in the art. The person skilled in the art selects additives (D) in such a way that these are adequately stable under the conditions of processing and moreover exhibit no significant absorption in the near-infrared wavelength region.

It is preferable that the person skilled in the art selects, from the compounds that can be used, additives (D) which have in essence no absorption in the wavelength range from 1000 nm to 1600 nm. In particular, additives (D) that can be used here are those transparent to radiant heat or those which have strongly reflective properties in the wavelength range mentioned. Additives (D) that can be used are particularly those which moreover are stable under the conditions of processing and do not adversely affect the polymer melt.

Preference is given to reinforcing agents transparent to radiant heat as additive (D), particular preference being given to glass fibers, in particular chopped glass fibers.

Other additives (D) that can be used are functional polymers, in particular impact modifiers, as long as these in essence have no absorption in the near-infrared wavelength range, in particular from 1000 nm to 1600 nm.

Conventional rubbers can be used, examples being ethylene copolymers having reactive groups, acrylate rubber, and polymers of conjugated dienes, e.g. polybutadiene rubber and polyisoprene rubber. The diene polymers can have been to some extent or completely hydrogenated in a manner known per se. Other examples that can be used are acrylonitrile-butadiene rubber, hydrogenated styrene-butadiene rubber, ethylene-propylene-diene rubber, polybutylene rubbers, and polyoctenamer rubbers, ionomers, block copolymers composed of vinyl aromatic monomers with dienes, such as butadiene or isoprene (known per se from EP-A 62 282) having $M^1M^2$, $M^1M^2M^1M^2$, or $M^1M^2M^1$ structure, where these block polymers can also comprise segments having random distribution, and also star-block copolymers. Use can in particular be made of polymers of conjugated dienes, e.g. polybutadiene rubber or polyisoprene rubber. These synthetic rubbers are familiar to the person skilled in the art and are summarized in "Ullmanns Encyklopädie der Technischen Chemie" [Ullmann's Encyclopedia of Industrial Chemistry], $4^{th}$ edition, Vol. 13, pages 595 to 634, Verlag Chemie GmbH, Weinheim 1977.

Flame retardants that can be used are flame retardants known to the person skilled in the art, in particular phosphorus-comprising compounds, in particular organophosphorus compounds, and also halogenated organic compounds. Examples of phosphorus compounds are phosphoric esters, phosphinic esters, phosphine oxides, phosphorus, and organic phosphates, as long as these in essence have no absorption in the near-infrared wavelength range, in particular from 1000 nm to 1600 nm.

The person skilled in the art preferably selects additives (D) in such a way that these are transparent in the range from 1000 nm to 1600 nm. Transmittance is determined in the wavelength range mentioned by the method described under black pigment (B).

The additives (D) preferably have high thermal stability. In particular, the additives (D) are thermally stable to at least 300° C. to DIN EN 12877-1.

In another embodiment, additives (D) that can be used are those which have strongly reflective properties with respect to radiant heat in the near-infrared wavelength range. IR radiation is reflected by strongly reflective additives (D) and is radiated via a suitable region within a module or within a component, in particular via the lens of a headlamp, from the component into the environment. To this extent, the reflective additives (D) merely bring about a change in the path traversed by radiation in the near-infrared wavelength range, before the radiant heat is then radiated out from the component or from the module.

Additives (D) that are reflective in the near-infrared wavelength range and that can be used in the wavelength range mentioned are foreign particles with strong scattering properties, in particular titanium dioxide pigments and inorganic mixed-phase pigments (e.g. Sicotan® Pigments, BASF), or foreign particles that have strongly reflective properties in the near-infrared wavelength range, e.g. aluminum flakes and luster pigments, e.g. those based on coated aluminum lamellae.

Preparation of the Thermoplastic Molding Compositions

An inventive process for the preparation of the thermoplastic molding compositions comprises the following steps:
(1) provision of components (A) and (B), and also, if appropriate, (C) and (D)
(2) mixing of the organic black pigment (B) and, if appropriate, of components (C) and (D) with the thermoplastic polymer (A) in a mixing apparatus.

Mixing apparatuses that can be used are mixing apparatuses known to the person skilled in the art, e.g. screw extruders, preferably twin-screw extruders, Brabender mixers, or Banbury mixers, and also kneaders.

The mixing in step (2) preferably takes place in accordance with the following steps carried out in succession:
(2a) optional preblending of the thermoplastic polymer (A) and component (B), and also, if appropriate, of components (C) and (D), and then introduction of the preblend in the solid state into the mixing apparatus,
(2b) mixing of components (A) and (B), and also optionally (C) and (D) in the flowable state of component (A), preferably in the molten state of component (A), in particular via extrusion,
(2c) optional cooling of the mixture,
(2d) optional comminution of the cooled mixture.

Intensive mixing is advantageous in order to maximize homogeneity of the resultant molding composition. Average mixing times required for this are generally from 0.2 to 30 minutes at temperatures of from 260 to 370° C., preferably from 290 to 360° C.

The sequence of addition of the components can be varied. In one embodiment, two or, if appropriate, three components are premixed and then introduced into the mixing apparatus. In another embodiment, all of the components are premixed together and then introduced into the mixing apparatus.

Incorporation of the organic black pigments (B) into the polymer (A) can also take place via rolling, pressing, or kneading. The abovementioned mixing processes can process the plastics to give plastics moldings, continuous profiles, sheets, foils, fibers, films, and coatings.

In particular in relation to the addition of the organic black pigment, a distinction can be drawn between cold feed and hot feed. The term "cold feed" means that step (2a) includes preblending of components (A) and (B) in the solid state and step (2b) then includes mixing in the mixing apparatus under conditions in which the polymer (A) is flowable. The term "hot feed" means that addition of the organic black pigment (B) to the thermoplastic polymer (A) in step (2b) takes place within the mixing apparatus after the thermoplastic polymer (A) has reached a flowable, in particular molten, state.

The cold feed variant of addition of (B) to (A) is preferred, i.e. it is preferable that components (A) and (B) are mixed in the solid state and then melted in the mixing apparatus.

The optional addition of components (C) and (D) can likewise take place via hot feed or cold feed.

Components (B) and, if appropriate, (C) and (D) are dispersed with maximum homogeneity in the polymer (A) in the mixing apparatus.

Selection of the parameters of throughput, screw rotation rate, and melt temperature in the mixing process depends on the screw combination and extruder size used, and can be optimized by a person skilled in the art in a few preliminary experiments with a view to ideal dispersion quality of the pigments.

In one preferred embodiment, "masterbatches" are obtained in the abovementioned manner and are often termed color masterbatches or additive masterbatches, and comprise the relevant pigment and, respectively, the additives, at relatively high concentration.

The use of colored masterbatches gives uniformly colored components of high color quality. However, these often have relatively poor mechanical properties when compared with components made of the comparable uncolored underlying polymers. The proportions of color masterbatches usually added to the uncolored pellets ("dry mix") are from 1 to 15%. When color masterbatches are used, care has to be taken that dispersion of the masterbatch in the uncolored pellets is very uniform, in order to avoid any color inhomogeneity in the component, or color variations between two or more components. The level of this type of inhomogeneity or variation can be reduced, for example, via use of specific masterbatch feed systems and/or mixing elements. In injection molding, it is also possible to use static mixers, in particular in the nozzle region, or else dynamic mixers, in particular in the region of the non-return valve.

In another embodiment, the method of incorporation of the organic black pigments (B) can be such that the entire thermoplastic molding composition is bulk-colored, i.e. that the pigment concentration in the entire thermoplastic molding composition is by this stage the same as that present in the subsequent molding.

The grain size of component (A) can vary widely in the inventive process, for example from a few micrometers to a few millimeters. The person skilled in the art uses simple preliminary experiments to select a suitable grain size for component (A) for homogeneous incorporation of components (B) and, if appropriate, (C) and (D) into the thermoplastic polymer (A).

If component (A) used in the inventive process is polyether sulfone (PESU), the melt volume rate MVR of component (A) to ISO 1133 at 360° C. and with a test load of 10 kg is, according to one preferred embodiment, at least 40 $cm^3/10$ min, in particular at least 60 $cm^3/10$ min, particularly preferably at least 80 $cm^3/10$ min.

Known injection-molding processes are then preferably used to produce moldings or plastics components. It is also possible to use processes known to the person skilled in the art for production of moldings or of plastics components, e.g. extrusion of semifinished product, for example to give sheets or profiles, or blow molding, for example to give bottles or containers. The abovementioned steps (2c) and (2d) of the inventive process can moreover be omitted if the mixture while it is still flowable is introduced immediately to further processing, for example by means of injection molding. These processes, and also variants thereof, are well known to the person skilled in the art.

Properties and Use

A feature of the inventive thermoplastic molding compositions is high thermal stability together with high resistance to migration. In particular, the moldings or components obtainable from the inventive thermoplastic molding compositions exhibit a particularly low level of heating via accumulated heat, when the relevant moldings or components include strong heat sources, in particular light sources or electrical or electronic components. At the same time, the resultant moldings and components exhibit high opacity in the visible-light wavelength range.

Another feature of the inventive molding compositions is good mechanical properties, for example high heat-distortion temperature, notched impact resistance, and stiffness. The inventive molding compositions moreover exhibit high stability during processing, in particular melt stability, and good flow properties.

Moldings, components, foils, or membranes which comprise the inventive thermoplastic molding compositions are preferably used in applications in which the parts mentioned have exposure to prolonged irradiation by light, or to other heat sources. The inventive thermoplastic molding compositions are particularly preferably used for production of headlamps, headlamp reflectors, headlamp panels, and headlamp housings, in particular in the automobile sector.

The inventive thermoplastic molding compositions are moreover preferably used in plastics components, moldings, foils, or membranes in applications within electronics or within the electrical industry, in particular in housings and protective covers for equipment which in prolonged operation generates large amounts of waste heat.

The inventive molding compositions are moreover suitable for production of plastics components, moldings, foils, or fibers which, by way of example, are used as household items, or electrical or electronic components, or medical-technology equipment.

EXAMPLES

Preparation of Organic Black Pigments (B)

Perylene pigment a: cis/trans-isomer mixture of formula P-Ia and P-Ib, where $R^1=R^2=$1,2-phenylene, and n=0 a) Preparation of crude pigment: 78.4 g of perylene-3, 4:9, 10-tetracarboxylic dianhydride, 16.3 g of piperazine, and 51.9 g of o-phenylenediamine were introduced into a stirred melt of 318 g of phenol at 70° C. The mixture was heated to 180° C. and stirred at this temperature for 8 h. The resultant water of reaction was removed here from the mixture in the form of azeotrope with phenol. After cooling to 130° C., slow dropwise addition of 350 g of methanol, and one hour of continued stirring at 60° C., the reaction product was filtered off, washed with methanol until a clear filtrate was produced, dried at 100° C. in vacuo, and then pulverized. This gave 106 g of a black powder in the form of acicular crystals of size up to more than 10 μm, corresponding to 99% yield.

b) Pigment preparation: 50 g of the black powder obtained in step a) were ground in a 1.3 l oscillatory mill for 10 h with 2.6 kg of steel balls (diameter 25 mm). After removal of the grinding balls, the ground product was then stirred in a mixture composed of 250 g of toluene and 250 g of water at 150° C. for 5 h in an autoclave. Toluene was removed by azeotropic distillation and then the product was filtered off, washed with water, dried at 100° C. in a convection drying cabinet, and then pulverized. The primary particle size of the resultant crystalline black perylene pigment a was from 40 to 300 nm.

Perylene pigment b: cis/trans-isomer mixture of formula P-Ia and P-Ib, where $R^1=R^2=$1,8-naphthylene, and n=0 a) Preparation of crude pigment: 78.4 g of perylene-3,4:9, 10-tetracarboxylic dianhydride, 16.3 g of piperazine, and 75.9 g of 1,8-diaminonaphthalene were introduced into a stirred melt of 265 g of phenol at 70° C. The mixture was heated to 180° C. and stirred at this temperature for 8 h. The resultant water of reaction was removed here from the mixture in the form of azeotrope with phenol. After cooling to 130° C., slow dropwise addition of 350 g of methanol, and one hour of continued stirring at 60° C., the reaction product was filtered off, washed with methanol until a clear filtrate was produced, dried at 100° C. in vacuo, and then pulverized. This gave 125 g of a black powder in the form of acicular crystals whose size was from 90 to 300 nm, corresponding to 98% yield.

b) Pigment preparation: 50 g of the black powder obtained in step a) were ground in a 1.3 l oscillatory mill for 10 h with 2.6 kg of steel balls (diameter 25 mm). After removal of the grinding balls, the ground product was then stirred in 700 g of xylene at 180° C. for 5 h in an autoclave. Xylene was removed by distillation in vacuo and then the product was dried at 100° C. in a convection drying cabinet, and then pulverized. The primary particle size of the resultant crystalline black perylene pigment b was from 30 to 150 nm.

Compounding

Incorporation of the pigments and other additives took place in a ZSK 25 twin-screw extruder from Werner & Pfleiderer with L/D of 34. Throughput was 10 kg/h, with screw rotation rate of from 400 to 500 rpm and melt temperature of from 310 to 330° C.

Injection Molding

For production of sample plaques (80×60×2 mm) the injection-molding machine used was an Arburg 270S (L/D: 21.4). Melt temperature was 360° C., and mold temperature was 160° C. The shot weight of 29 g was introduced within 1.17 s and a hold pressure of 800 bar was then maintained for 20 s. All of the products were dried at 140° C. (4 h) prior to injection molding.

Thermoplastic Polymers (A) Used

PESU-1

Component (A) "PESU-1" was uncolored poly(oxy-1,4-phenylenesulfonyl-1,4-phenylene), the ISO 1043 term for which is polyether sulfone (PESU), with MVR of 150 cm³/10 min to ISO 1133 at 360° C. using a test load of 10 kg (Ultrason® E1010 uncolored from BASF Aktiengesellschaft). The PES comprised no pigments. The PESU was processed in the abovementioned laboratory extruder to give masterbatches.

PESU-Comp. 2

Component (A) "PESU-comp. 2" used was a polyether sulfone (PESU to ISO 1043) using carbon black for black coloring, with MVR of 77 cm³/10 min to ISO 1133 at 360° C. using a test load of 10 kg (Ultrason® E2010 Black Q31 from BASF Aktiengesellschaft). This is a conventional non-inventive thermoplastic molding composition.

PESU-3

Component (A) "PESU-3" used was an uncolored polyether sulfone (PESU to ISO 1043), with MVR of 77 cm³/10 min to ISO 1133 at 360° C. using a test load of 10 kg (Ultrason® E2010 uncolored from BASF Aktiengesellschaft).

PEI-1

Component (A) "PEI-1" used was polyetherimide (PEI) of the structure VI₁ from GE Plastics (Ultem® 1010) with MVR of 70 cm³/10 min to ISO 1133 at 360° C. using a test load of 10 kg.

Preparation of Masterbatches:

| Master-batch | Component (A) | Component (B) | Component (C) |
|---|---|---|---|
| 1 | PESU-1 | 2% by weight of perylene pigment a | 0% by weight |
| 2 | PESU-1 | 2% by weight of perylene pigment b | 0% by weight |
| 3 | PESU-1 | 4% by weight of perylene pigment b | 0% by weight |
| 4 | PESU-1 | 2% by weight of perylene pigment b | 5% by weight of stearic acid (CAS No. 57-11-4) |
| 5 | PESU-1 | 4% by weight of perylene pigment b | 5% by weight of stearic acid (CAS No. 57-11-4) |
| 6 | PEI-1 | 4% by weight of perylene pigment b | 0% by weight |

Example 1

96 parts by weight of PESU-3 were mixed with 4 parts by weight of masterbatch 1 and, after drying of the pellets, processed to give black plaques of thickness 2 mm. The concentration of the organic black pigment (B) in the plaques was 0.08% by weight.

Example 2

96 parts by weight of PESU-3 were mixed with 4 parts by weight of masterbatch 2 and, after drying of the pellets, processed to give black plaques of thickness 2 mm.

Example 3

96 parts by weight of PESU-3 were mixed with 4 parts by weight of masterbatch 3 and, after drying of the pellets, processed to give black plaques of thickness 2 mm. The concentration of the organic black pigment (B) in the plaques was 0.16% by weight.

Example 4

92 parts by weight of PESU-3 were mixed with 8 parts by weight of masterbatch 3 and, after drying of the pellets, processed to give black plaques of thickness 2 mm. The pigment concentration of the plaques here was 0.32% by weight.

Example 5

96 parts by weight of PESU-3 were mixed with 4 parts by weight of masterbatch 4 and, after drying of the pellets, processed to give black plaques of thickness 2 mm.

Example 6

96 parts by weight of PESU-3 were mixed with 4 parts by weight of masterbatch 5 and, after drying of the pellets, processed to give black plaques of thickness 2 mm.

Example 7

96 parts by weight of PEI-1 were mixed with 4 parts by weight of masterbatch 6 and, after drying of the pellets, processed to give black plaques of thickness 2 mm. The pigment concentration of the plaques here was 0.16% by weight.

Comparative Example 8

100 parts by weight of PESU-comp. 2 were processed in the abovementioned manner to give black plaques of thickness 2 mm.

Tests

Heat Test

In order to study the performance of the plaques in respect of heating on exposure to radiant heat, they were placed for 2 min at a distance of 2 cm above a 20-watt halogen lamp, and then removed, and an IR-heat-imaging camera was used to measure the temperature of the side facing toward the lamp after a waiting time of 10 s. Table 1 collates the results.

The inventive thermoplastic molding compositions exhibit markedly lower temperatures when compared with product (comparative example comp. 8) conventionally black-colored (using carbon black).

The use of a mold-release agent leads to higher opacity in the visible-light wavelength region for the same pigment concentration, but the surface temperature measured is at least as low. If the intention is to achieve the same opacity without mold-release agent, pigment concentration then has to be increased, leading to higher surface temperatures.

| Example | 1 | 2 | 3 | 4 | 5 | 6 | 7 | comp. 8 |
|---|---|---|---|---|---|---|---|---|
| Masterbatch No. | 1 | 2 | 3 | 3 | 4 | 5 | 6 | PESU-comp. 2 |
| Mold-release agent (C) | no | no | no | no | yes | yes | no | yes |
| Perylene pigment a [% by weight] | 0.08 | — | — | — | — | — | — | — |
| Perylene pigment b [% by weight] | — | 0.08 | 0.16 | 0.32 | 0.08 | 0.16 | 0.16 | — |
| Opacity* | ○ | ○/+ | + | ++ | + | ++ | ++ | ++ |
| Temperature [° C.] | 118 | 130 | 143 | 155 | 130 | 140 | 145 | 192 | qualitative assessment: (++) = very high; (+) = high; (○) = moderate; (−) = low

The invention claimed is:

1. A thermoplastic molding composition comprising:
(A) at least 34% by weight of at least one thermoplastic polymer selected from (i) polyarylene ethers, (ii) polyetherimides, (iii) polyarylene sulfides, and (iv) polycarbonates with a glass transition temperature of at least 145° C., or else copolymers of the abovementioned polymers (i) to (iv),
(B) from 0.01 to 10% by weight of at least one organic black pigment which is transparent in the wavelength range from 1000 nm to 1600 nm and which has thermal stability up to at least 300° C. in accordance with DIN EN 12877-1,
(C) from 0.01 to 6% by weight of at least one mold-release agent selected from the group consisting of stearic acid, metal salts of stearic acid, esters of stearic acid, and amides of stearic acid, and (D) from 0 to 50% by weight of one or more additives selected from the group consisting of antioxidants, UV stabilizers, heat stabilizers, flame retardants, flow improvers, dispersing agents, and reinforcing agents, where the total of the % by weight figures from (A), (B), (C) and (D) does not exceed 100% by weight.

2. The thermoplastic molding composition according to claim 1, where the thermoplastic molding composition comprises, as component (B), from 0.01 to 10% by weight of at least one of the isomers P-Ia or P-Ib:

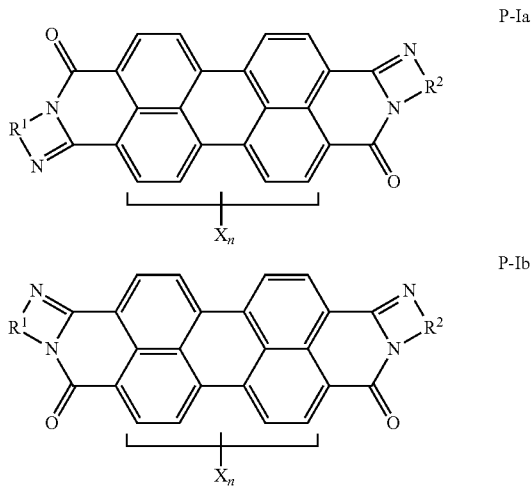

wherein the variables in P-Ia and P-Ib have the following meaning:

$R^1$, $R^2$, independently of one another, is a phenylene, naphthylene, or pyridylene, each of which can have one or more $C_1$-$C_{12}$-alkyl, $C_1$-$C_6$-alkoxy, hydroxy, nitro, and/or halogen substituents;

X is a halogen;

n is from 0 to 4.

3. The thermoplastic molding composition according to claim 1, where the thermoplastic molding composition comprises, as component (B), from 0.01 to 10% by weight of at least one of the isomers P-Ia' or P-Ib':

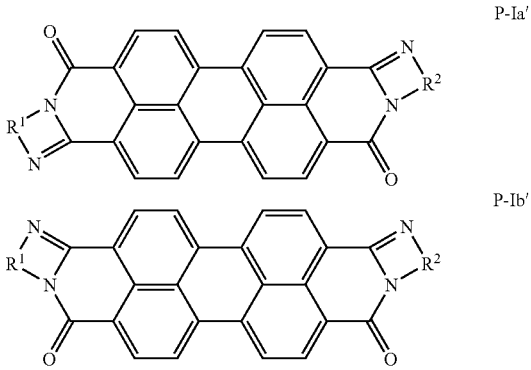

where the variables in P-Ia' and P-Ib' have the following meaning:

$R^1$, $R^2$, independently of one another, is a phenylene, naphthylene, or pyridylene, each of which can have one or more $C_1$-$C_{12}$-alkyl, $C_1$-$C_6$-alkoxy, hydroxy, nitro, and/or halogen substituents.

4. The thermoplastic molding composition according to claim 2, where the radicals $R^1$ and $R^2$ are identical and is unsubstituted phenylene or naphthylene.

5. The thermoplastic molding composition according to claim 1, where the thermoplastic molding composition comprises, as component (A), from 34 to 99.99% by weight of at least one thermoplastic polymer selected from polyarylene ethers and copolyarylene ethers.

6. The thermoplastic molding composition according to claim 1, where the thermoplastic molding composition comprises, as component (A), from 34 to 99.99% by weight of at least one thermoplastic polymer selected from polyetherimides and copolyetherimides.

7. The thermoplastic molding composition according to claim 1, where the thermoplastic molding composition comprises, as component (A), from 34 to 99.99% by weight of at least one thermoplastic polymer selected from polycarbonates and copolycarbonates with glass transition temperature of at least 145° C.

8. The thermoplastic molding composition according to claim 1, where the at least one mold-release agent has been selected from the group of the compounds consisting of stearic acid and metal salts of stearic acid.

9. A process for preparation of thermoplastic molding compositions according to claim 1, comprising
(1) providing components (A), (B), and (C) and optionally (D)
(2) mixing of the organic black pigment (B) and (C) and optionally component (D) with the thermoplastic polymer (A) in a mixing apparatus.

10. The process according to claim 9, where components (A) and (B) are mixed in the solid state and then are melted in the mixing apparatus.

11. A molding, obtained from the thermoplastic molding compositions according to claim 1.

12. The thermoplastic molding composition according to claim 3, where the radicals $R^1$ and $R^2$ are identical and is unsubstituted phenylene or naphthylene.

13. A process for reducing heat accumulation in plastic components, moldings, foils, or membranes comprising:
utilizing a thermoplastic molding composition comprising:
(A) at least 34% by weight of at least one thermoplastic polymer selected from (i) polyarylene ethers, (ii) polyetherimides, (iii) polyarylene sulfides, and (iv) polycarbonates with a glass transition temperature of at least 145° C., or else copolymers of the abovementioned polymers (i) to (iv);
(B) from 0.01 to 10% by weight of at least one organic black pigment which is transparent in the wavelength range from 1000 nm to 1600 nm and which has thermal stability up to at least 300° C. in accordance with DIN EN 12877-1;
(C) from 0.01 to 6% by weight of at least one mold-release agent selected from the group consisting of stearic acid, metal salts of stearic acid, esters of stearic acid, and amides of stearic acid, and
(D) from 0 to 50% by weight of one or more additives selected from the group consisting of antioxidants, UV stabilizers, heat stabilizers, flame retardants, flow improvers, dispersing agents, and reinforcing agents;
wherein the total of the % weight figures from (A), (B), (C) and (D) does not exceed 100% by weight.

14. The process of claim 13 wherein said plastic components, moldings, foils, or membranes are headlamp reflectors or headlamp housings.

15. A thermoplastic molding composition consisting of:
(A) at least 34% by weight of at least one thermoplastic polymer selected from (i) polyarylene ethers, (ii) polyetherimides, (iii) polyarylene sulfides, and (iv) polycarbonates with a glass transition temperature of at least 145° C., or else copolymers of the abovementioned polymers (i) to (iv),
(B) from 0.01 to 10% by weight of at least one organic black pigment which is transparent in the wavelength range from 1000 nm to 1600 nm and which has thermal stability up to at least 300° C. in accordance with DIN EN 12877-1,
(C) from 0.01 to 6% by weight of at least one mold-release agent selected from the group consisting of stearic acid, metal salts of stearic acid, esters of stearic acid, and amides of stearic acid, and
(D) from 0 to 50% by weight of one or more additives selected from the group consisting of antioxidants, UV stabilizers, heat stabilizers, flame retardants, flow improvers, dispersing agents, and reinforcing agents,
where the total of the % by weight figures from (A), (B), (C) and (D) gives 100% by weight.

16. The thermoplastic molding composition of claim 15 wherein said mold-release agent is selected from the group consisting of stearic acid and metal salts of stearic acid.

17. The thermoplastic molding composition of claim 13 wherein said mold-release agent is selected from the group consisting of stearic acid and metal salts of stearic acid.

* * * * *